US012289645B2

United States Patent
Xu et al.

(10) Patent No.: US 12,289,645 B2
(45) Date of Patent: Apr. 29, 2025

(54) MCG FAILURE RECOVERY ENHANCEMENT IN DC MODE

(71) Applicant: Apple Inc., Cupertino, CA (US)

(72) Inventors: Fangli Xu, Beijing (CN); Dawei Zhang, Cupertino, CA (US); Haijing Hu, Cupertino, CA (US); Naveen Kumar R Palle Venkata, Cupertino, CA (US); Sethuraman Gurumoorthy, Cupertino, CA (US); Srirang A Lovlekar, Cupertino, CA (US); Yuqin Chen, Cupertino, CA (US); Zhibin Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,093

(22) PCT Filed: Jan. 28, 2021

(86) PCT No.: PCT/CN2021/074091
§ 371 (c)(1),
(2) Date: Aug. 4, 2022

(87) PCT Pub. No.: WO2022/160159
PCT Pub. Date: Aug. 4, 2022

(65) Prior Publication Data
US 2023/0362751 A1    Nov. 9, 2023

(51) Int. Cl.
*H04W 36/00* (2009.01)
(52) U.S. Cl.
CPC ......... *H04W 36/00698* (2023.05); *H04W 36/00695* (2023.05); *H04W 36/0079* (2018.08)
(58) Field of Classification Search
CPC ..... H04W 36/00698; H04W 36/00695; H04W 36/0079; H04W 76/15; H04W 76/19
See application file for complete search history.

(56) References Cited

U.S. PATENT DOCUMENTS 10,616,945 B2 * 4/2020 Yu .............................. H04L 1/08
11,375,567 B2 * 6/2022 Wu ........................ H04W 76/27
(Continued)

FOREIGN PATENT DOCUMENTS

CN    111050348 A    4/2020
CN    111565407 A    8/2020
(Continued)

OTHER PUBLICATIONS

International Search Report and Written Opinion for International application No. PCT/CN2021/074091 filed Jan. 28, 2021 on behalf of Apple Inc et al, Mail Date: Nov. 3, 2021. (7 pages).
(Continued)

*Primary Examiner* — Kabir A Timory
(74) *Attorney, Agent, or Firm* — Kubota & Basol LLP

(57) ABSTRACT

Methods and systems are disclosed for a UE of a wireless communication network to recover from MCG radio link failures in a MR-DC system when the SCG is deactivated or otherwise not enabled. When a MCG link failure is detected and the SCG is deactivated, the UE may activate the SCG for the UE to use the SCG link to transmit and receive signaling messages or data as part of the MCG failure recovery procedure. When the MCG link failure is detected and the UE is configured to add the SCG upon the satisfaction of certain condition, but the condition has not occurred, the UE may check to determine whether one condition is MCG failure and whether the radio link quality of the SCG exceeds a threshold. If the radio link quality of the SCG exceeds the threshold, the UE may apply the SCG configuration to add the SCG.

20 Claims, 13 Drawing Sheets

(56) References Cited

U.S. PATENT DOCUMENTS

2019/0124558 A1 4/2019 Ang et al.
2022/0030659 A1* 1/2022 Kim ..................... H04W 76/19

FOREIGN PATENT DOCUMENTS

| | | |
|---|---|---|
| CN | 111565424 A | 8/2020 |
| CN | 112020888 A | 12/2020 |
| EP | 4096341 A1 | 11/2022 |
| EP | 4223067 A1 | 8/2023 |
| WO | 2018170885 A1 | 9/2018 |
| WO | 2022071848 A1 | 4/2022 |

OTHER PUBLICATIONS

International Preliminary Report on Patentability for International application No. PCT/CN2021/074091 filed Jan. 28, 2021 on behalf of Apple Inc et al, Mail Date: Aug. 10, 2023. (6 pages).
Extended European Search Report for Application No. 21921779.1 filed Jun. 19, 2023 on behalf of Apple Inc et al, Mail Date: Sep. 30, 2024. (11 pages).
Lenovo et al., "General issues on SCG activation and deactivation", 3GPP TSG-RAN WG2 Meeting #113e, Online, Jan. 25-Feb. 5, 2021, R2-2101121, retrieved Jan. 15, 2021, XP051974118. (5 pages).
Ericsson, "Efficient SCG (de)activation", 3GPP TSG-RAN WG2 #112e, Electronic meeting, Nov. 2-13, 2020, R2-2010062, retrieved Oct. 22, 2020, XP052363104. (13 pages).
Search Report received for Chinese Patent Application No. 202180005500.2, mailed on Jan. 20, 2025, 4 Pages (2 Pages of English Translation and 2 Pages of Official Copy).

* cited by examiner

MCG FAILURE RECOVERY ENHANCEMENT IN DC MODE

RELATED APPLICATIONS

The present application is the national phase of International Application No. PCT/CN2021/074091, filed on Jan. 28, 2021 and the disclosure of which is hereby incorporated herein by reference in its entirety.

FIELD OF INVENTION

This invention relates generally to the field of wireless communication, and more particularly, to systems and methods for wireless communication devices to recover from radio link failure detected at the master cell group (MCG) when using dual connectivity (DC). Other aspects are also described.

BACKGROUND OF THE INVENTION

In wireless communications networks, a user equipment (UE) may communicate with a base station of the networks using one or more beams of a radio link. The UE may implement beam management to identify and maintain optimal beams for transmissions to and receptions from the base station (e.g., primary serving cell) as the channel characteristics change due to fluctuating environmental conditions, user mobility, etc. A beam may be characterized by pathloss, Doppler shift, delay, or other properties of the channel through which the beam propagates. The UE may monitor the quality of the radio beams in a link by implementing radio link monitoring procedure. When the radio condition changes such that existing beams become unreliable, the UE may select a new beam to recover the connection. When all the monitored beams in a primary serving cell become unreliable, or during a handover to another serving cell when the handover procedure fails, the UE may experience radio link failure.

When a radio link failure is detected, the UE may attempt to recover the connection or implement other radio link failure recovery procedures. In multi-RAT (radio access technology) dual connectivity (MR-DC) system, there may be two base stations to provide user plane connectivity for the UE using different air interfaces. For example, the MR-DC may have a master cell group (MCG) containing the primary serving cell for the UE using one RAT and a secondary cell group (SCG) containing cells that the UE may connect to using a second RAT. When a radio link failure is detected at the primary serving cell of the MCG, the UE may transmit a MCG failure message to a primary serving cell of the SCG using a signaling connection that has been configured for communicating signaling messages. The primary serving cell of the SCG may forward the MCG failure information to the primary serving cell of the MCG to request the MCG to reconfigure the link to the UE. The primary serving cell of the SCG may then receive reconfiguration information from the primary serving cell of the MCG for use to reconfigure the link to the UE.

However, the UE may not always count on the SCG link being available to deliver the MCG failure message as part of the MCG failure recovery procedure. For example, the primary serving cell of the SCG may have been deactivated by the network. In another scenario, the primary serving cell of the SCG may not be available because certain condition for using the SCG link has not been satisfied. When the MCG radio link failure is detected and the SCG is deactivated or otherwise not available, there is no signaling connection to the SCG that the UE may use to transmit the MCG failure message. The UE may then initiate a connection re-establishment procedure to attempt to recover the radio link with the MCG, introducing latency and signaling overhead. As such, there is a need for an enhanced failure recovery mechanism for MCG radio link failures in a MR-DC system.

SUMMARY OF THE DESCRIPTION

Methods and systems are disclosed for a UE of a wireless communication network to recover from MCG radio link failures in a MR-DC system in which the SCG is deactivated or otherwise not available. The MR-DC system may include a MCG having a primary serving cell connected to the UE using one RAT and a SCG link that the UE may connect using a second RAT. The network may have the flexibly to deactivate or activate the SCG to efficiently manage the traffic flow through the network. For example, the network may deactivate the SCG or a cell in the SCG if there is insufficient data traffic to be offloaded to the SCG. In another scenario, the network may conditionally add or change a primary serving cell of the SCG (PSCell) upon the satisfaction of certain conditions, such as when there is a need to enable the SCG link for high data throughput transmission. For example, the network may provide a target SCG configuration to the UE in advance with conditions for adding the PSCell, and when a condition for using the SCG link for high data throughput transmission is satisfied, the UE may apply the SCG configuration to add the PSCell. Even though the SCG is deactivated or conditionally unavailable, the SCG link may still be used for low data rate transmission such as for transmission of signaling messages. Accordingly, when a MCG link failure is detected, and if the radio link quality of the SCG allows the UE to use the SCG link to recover from the MCG link failure, the UE may configure and activate the SCG link to perform the MCG link failure recovery procedure.

In one aspect, when MCG link failure is detected and the SCG is in the deactivated state, the ULE may enter the SCG activated state for the UE to use the SCG link to transmit and receive signaling messages as part of the MCG failure recovery procedure. In one aspect, the UE may use a random access procedure to a base station of the SCG (e.g., PSCell) to request scheduled resources for use in transmitting signaling messages to the PSCell. When the scheduled resources are granted, the UE may transmit a MCG failure message to the PSCell using the established signaling connection on the SCG link. The PSCell may forward the MCG failure information to the primary serving cell of the MCG to request the MCG to reconfigure the link to the UE. The PSCell may receive reconfiguration information from the primary serving cell of the MCG for use to reconfigure the SCG link to the UE.

In one aspect, when the MCG link failure is detected and the SCG is in the deactivated state, the UE may determine if the radio link quality of the PSCell is sufficient before entering the SCG activated state. For example, if the radio link quality of the PSCell is greater than a configured threshold, the UE may enter the SCG activated state. The UE may then use the SCG link for the MCG failure recovery as described. Otherwise, if the radio link quality of the PSCell is not greater than the configured threshold, the UE may attempt to recover its radio link with the MCG.

In one aspect, when the MCG link failure is detected and the SCG is in the deactivated state, the UE may transmit data on the SCG link when the UE enters the SCG activated state. For example, upon SCG activation and after the UE transmits the MCG failure message to the PSCell on the signaling connection, the UE may transmit data using a data connection specific to the SCG link. If the data connection is configured on both the MCG link and the SCG link in a "split" configuration, the MCG link is normally configured as the primary data link and the SCG data link may be used only when the amount of data to transfer exceeds a threshold. However, for the MCG failure recovery procedure, the UE may transmit data using the SCG link regardless of whether the amount of data exceeds the threshold. In one aspect, the UE may suspend data transmission when the PSCell reconfigures the SCG link based on the reconfiguration information.

In one aspect, when the MCG link failure is detected and the UE is configured to add or change the SCG upon the satisfaction of certain condition, but the condition has not occurred, the UE may check to determine whether one such condition is MCG failure. If so, upon detecting MCG link failure, the UE may further determine whether the radio link quality of the PSCell exceeds a configured threshold. If the radio link quality of the PSCell exceeds the threshold, the UE may apply the SCG configuration to add or change the PSCell. The UE may transmit a signaling message to indicate that the UE has added or changed the PSCell as part of the random access procedure to the PSCell to request scheduling resources. The UE may then transmit the MCG failure message to the PSCell using the SCG link. Otherwise, if the radio link quality of the PSCell does not exceed the threshold, the UE may attempt to recover its radio link with the MCG.

In one aspect, instead of separately transmitting the MCG failure message after the random access procedure, the UE may transmit the MCG failure information as part of the random access procedure for a more compact signaling. The PSCell may interpret the MCG failure information as indicating that the UE has added or changed the PSCell.

In one aspect, a method for a UE to recover from MCG radio link failures in a MR-DC system when the SCG is deactivated or conditionally unavailable is disclosed. The method includes determining by the UE a failure condition in the MCG radio link based on radio link monitoring. The method also includes determining by the UE that the SCG radio link is either deactivated or conditionally unavailable. The method further includes the UE changing the SCG radio link to either an activated or a conditionally available state. The method further includes the UE transmitting over the SCG radio link information on the failure condition in the MCG radio link and the UE receiving over the SCG radio link a signaling command to reconfigure the SCG radio link to replace the MCG radio link.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
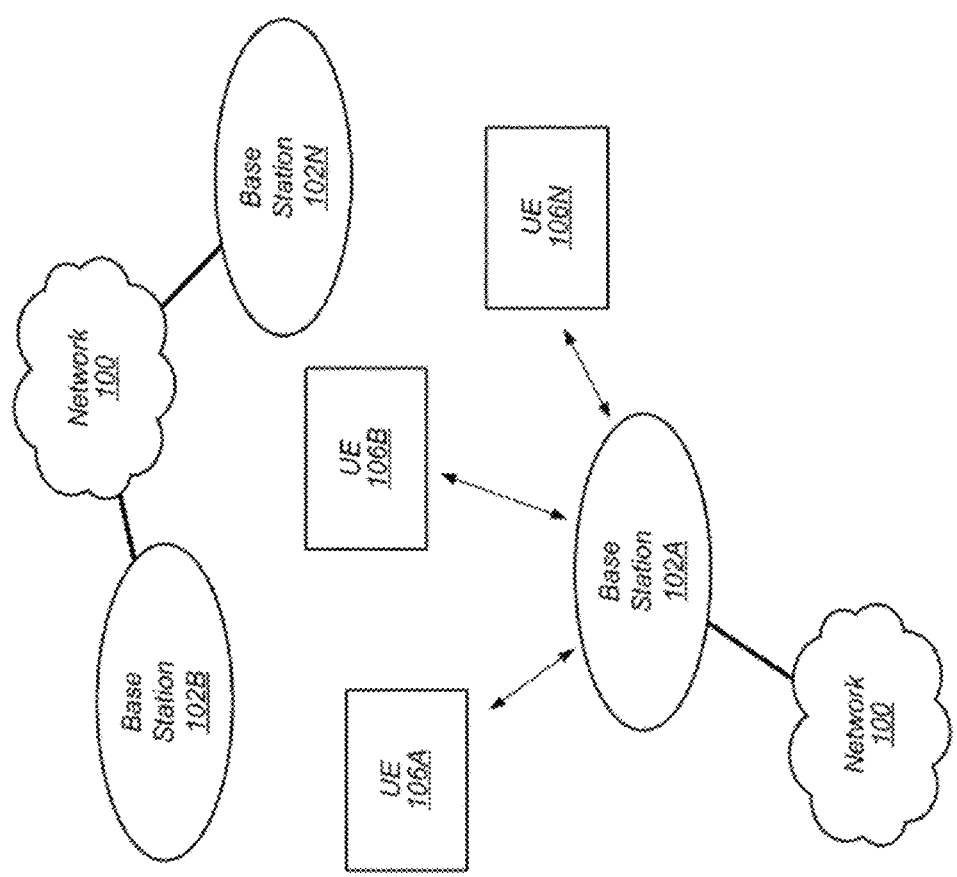
FIG. 1 illustrates an example wireless communication system according to one aspect of the disclosure.

Methods and systems are disclosed for a UE of a wireless communication network to recover from MCG radio link failures in a MR-DC system when the SCG is initially deactivated or conditionally unavailable. In one scenario, the SCG or the PSCell of the SCG may be deactivated if there is insufficient data traffic to be offloaded to the SCG. In another scenario, the SCG or the PSCell of the SCG may be unavailable and may be configured to conditionally add or change the PSCell of the SCG by applying target SCG configuration when certain condition of the SCG link is satisfied. When a MCG link failure is detected by the UE when the SCG is deactivated or conditionally unavailable, and if the radio link quality of the SCG link allows the UE to use the SCG link to recover from the MCG link failure, the UE may activate or add the SCG or the PSCell to provide the SCG link to perform the MCG link failure recovery procedure.

In one aspect, the MCG of the MR-DC system may be a 4G (LTE) or a next generation 4G base station and the SCG of the MR-DC system may be a 5G (New Radio or NR) base station. In one aspect, the MCG and the SCG of the MR-DC system may both be 5G base stations but using different RAT. The MR-DC system may be connected to a 5G core network. The control signaling protocol may be transmitted and received by the UE on a logical signaling connection such as a signaling radio bearer (SRB). The SRB may be configured as a split SRB to allow signaling messages to be received and transmitted by both the base station of the MCG and the base station of the SCG. The base station of the MCG may be referred to as the master node and the base station of the SCG may be referred to as the secondary node.

The UE may measure the quality of the radio links to the master node and the secondary node. When the UE detects a radio link failure to the master node and the SCG is in the deactivated state, the UE may enter the SCG activated state for the UE to use the SCG link to transmit signaling messages using SRB as part of the MCG failure recovery procedure. In one aspect, the UE may transmit a MCG failure message containing MCG failure information to the secondary node using the split SRB. The secondary node may forward the MCG failure information to the master node to request the master node to reconfigure the link to the UE. The secondary node may receive reconfiguration information from the master node. The secondary node may forward the reconfiguration information to the ULE to reconfigure the SCG link.

In one aspect, when the MCG link failure is detected and the SCG is in the deactivated state, the UE may determine if the quality of the radio link to the secondary node as measured by the UE is acceptable before entering the SCG activated state. For example, if the reference signal received power (RSRP) of the radio link to the secondary node is greater than a configured threshold, the UE may enter the SCG activated state. The UE may then use the SCG link for the MCG failure recovery as described. Otherwise, if the RSRP is not greater than the configured threshold, the UE may not activate the SCG and may instead attempt to recover the connection to the master node.

In one aspect, when the MCG link failure is detected and the SCG is in the deactivated state, the UE may transmit data on the SCG link when the UE enters the SCG activated state. For example, upon SCG activation and after the UE transmits the MCG failure message to the secondary node on the split SRB, the UE may transmit data to the secondary node using a logical data connection such as a data radio bearer (DRB). The DRB to the secondary node may be specific to the secondary node or may be configured as a split DRB to allow data to be received and transmitted by both the master node and the secondary node. For the SCG specific DRB, the UE may transmit the data to the secondary node upon the SCG activation. For the split DRB, the UE may transmit and receive data using the SCG link regardless of whether the amount of data to transmit exceeds the threshold normally associated with the split DRB to the secondary node. For example, if the SCG link is not the primary leg and even if the current amount of data to transmit is lower than the threshold, the UE may still enable the SCG link for the DRB transmission or may switch the primary leg from the MCG link to the SCG link autonomously. In one aspect, the UE may suspend data transmission on the DRB when the SCG link is reconfigured after receiving the reconfiguration information from the secondary node.

In one aspect, when the MCG link failure is detected and the UE is configured to add or change the SCG upon the satisfaction of certain condition, but the condition has not occurred, the UE may check to determine whether one such condition is MCG failure. If the network configures the addition or change of the SCG for the purpose of MCG link recovery, upon detecting MCG link failure, the UE may determine whether the radio link quality of the secondary node meets certain criteria for cell selection or exceeds a configured threshold. In one aspect, the network may configure the UE with the cell selection criteria using a broadcast signaling protocol or may configure the UE with the radio link threshold using control signaling specific to the UE.

If the radio link quality of the secondary node meets the criteria or exceeds the threshold, the UE may apply the SCG configuration information that has been provided to add or change the secondary node. The UE may transmit a signaling message to the secondary node to indicate that the UE has added or changed the secondary node as part of the random access procedure to the secondary node. The UE may then transmit the MCG failure message to the secondary node using the split SRB on the SCG link. Otherwise, if the radio link quality of the secondary node does not meet the criteria and does not exceed the threshold, the UE may attempt to recover the connection with the master node.

In one aspect, instead of separately transmitting the MCG failure message after the random access procedure, the UE may transmit the MCG failure information instead of the message to indicate that the UE has added or changed the secondary node as part of the random access procedure for a more compact signaling. The secondary node may interpret the MCG failure information as indicating that the UE has added or changed the secondary node.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5GNR, HSPA, 3GPP2 CDMA2000 (e.g., 1×RTT, 1×EV-DO, HRPD, eHIRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
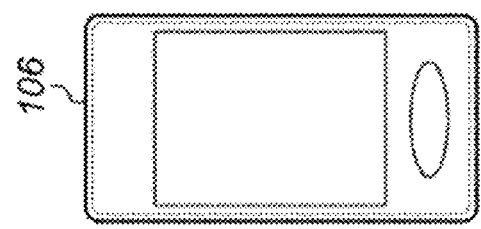
FIG. 2 illustrates user equipment in direct communication with a base station (BS) according to one aspect of the disclosure.
Figure 2:
Figure 2:
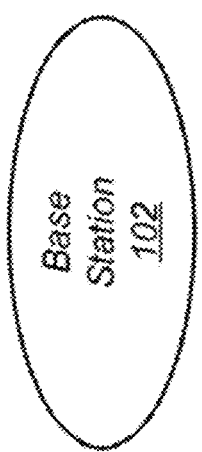

FIG. 2 illustrates a UE 106 in direct communication with a base station 102 through uplink and downlink communications according to one aspect of the disclosure. The UE 106 may be a device with cellular communication capability such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
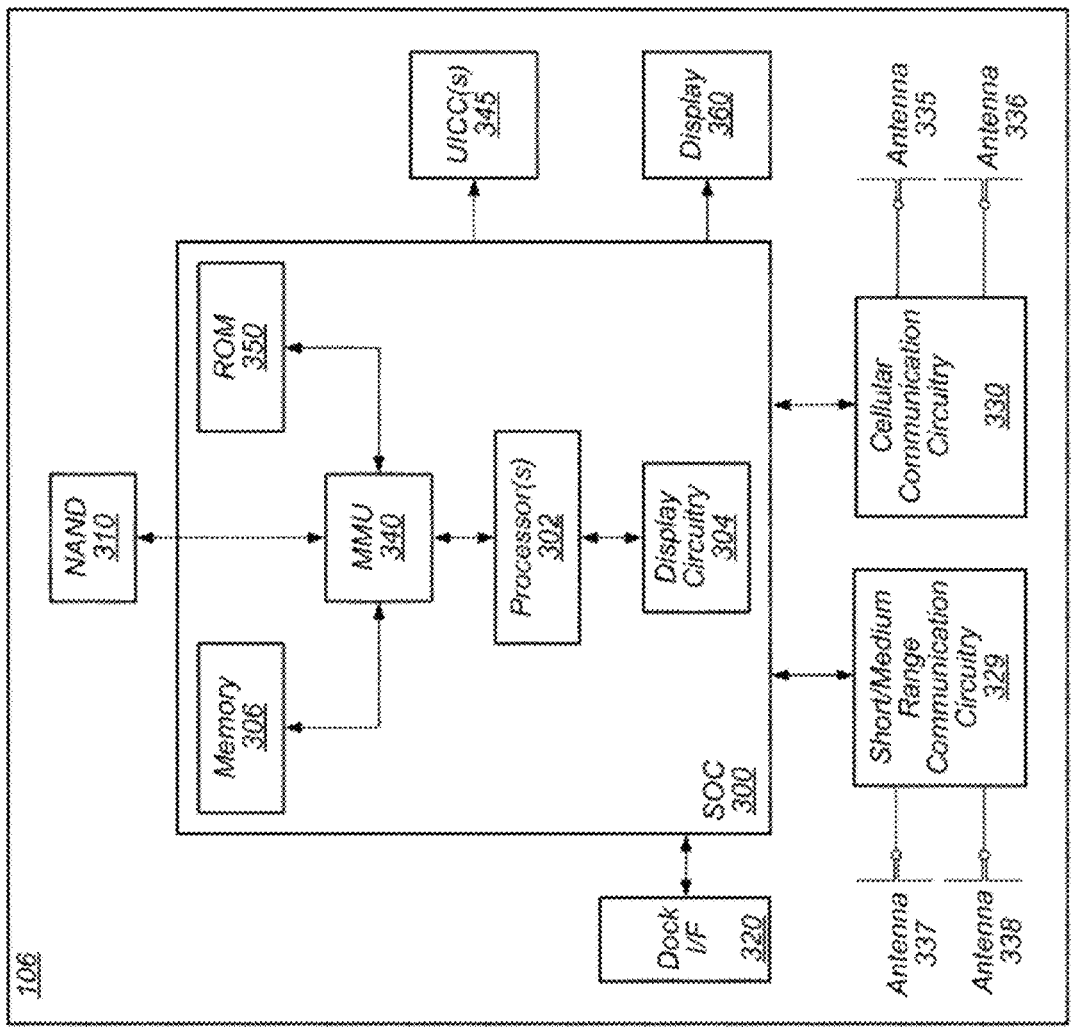
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
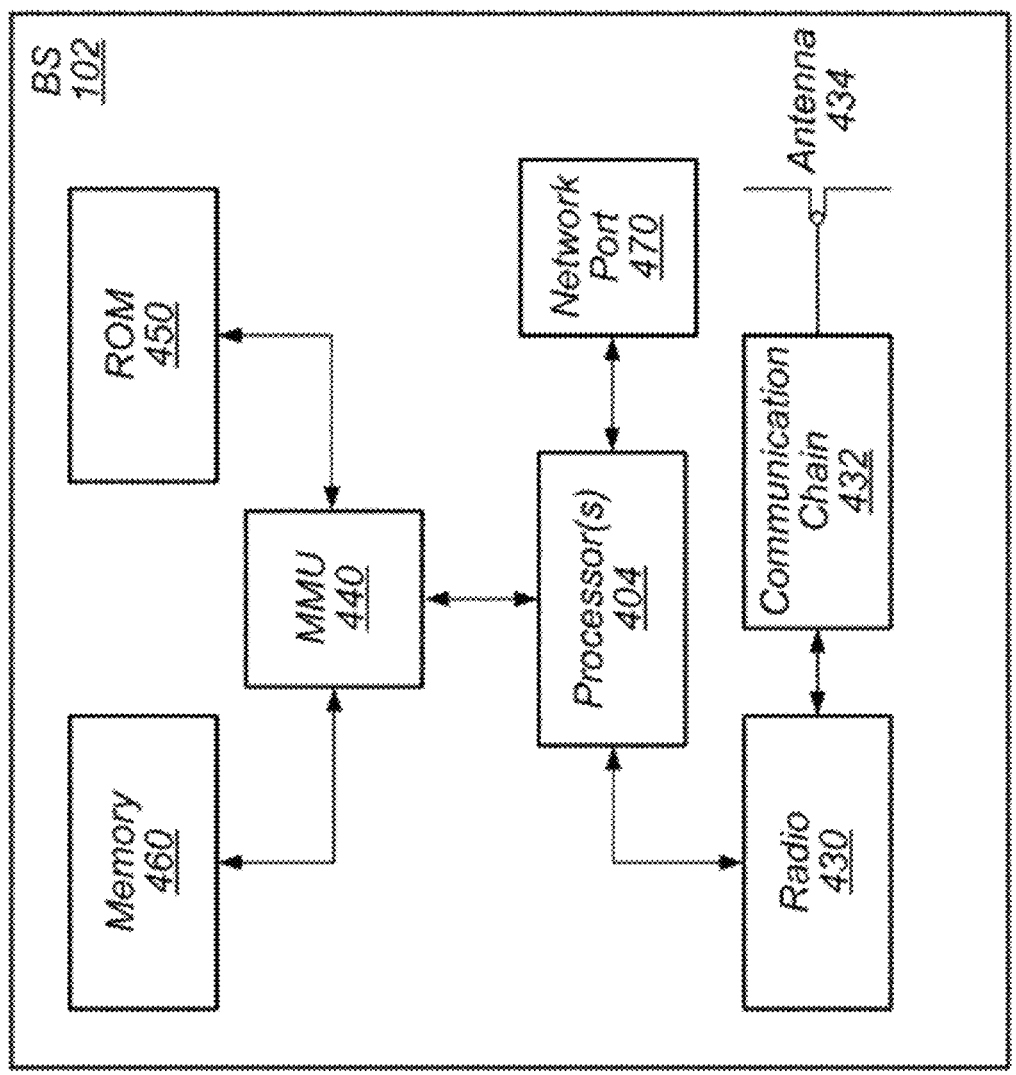
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
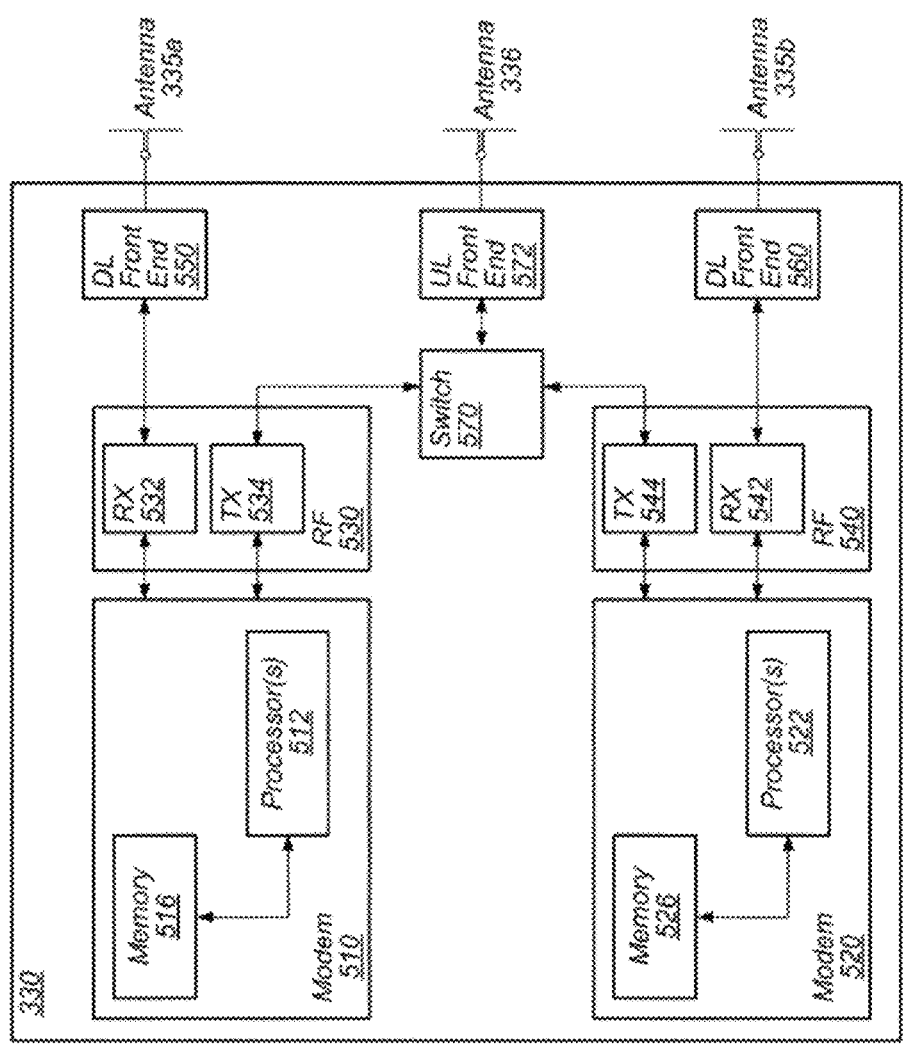
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
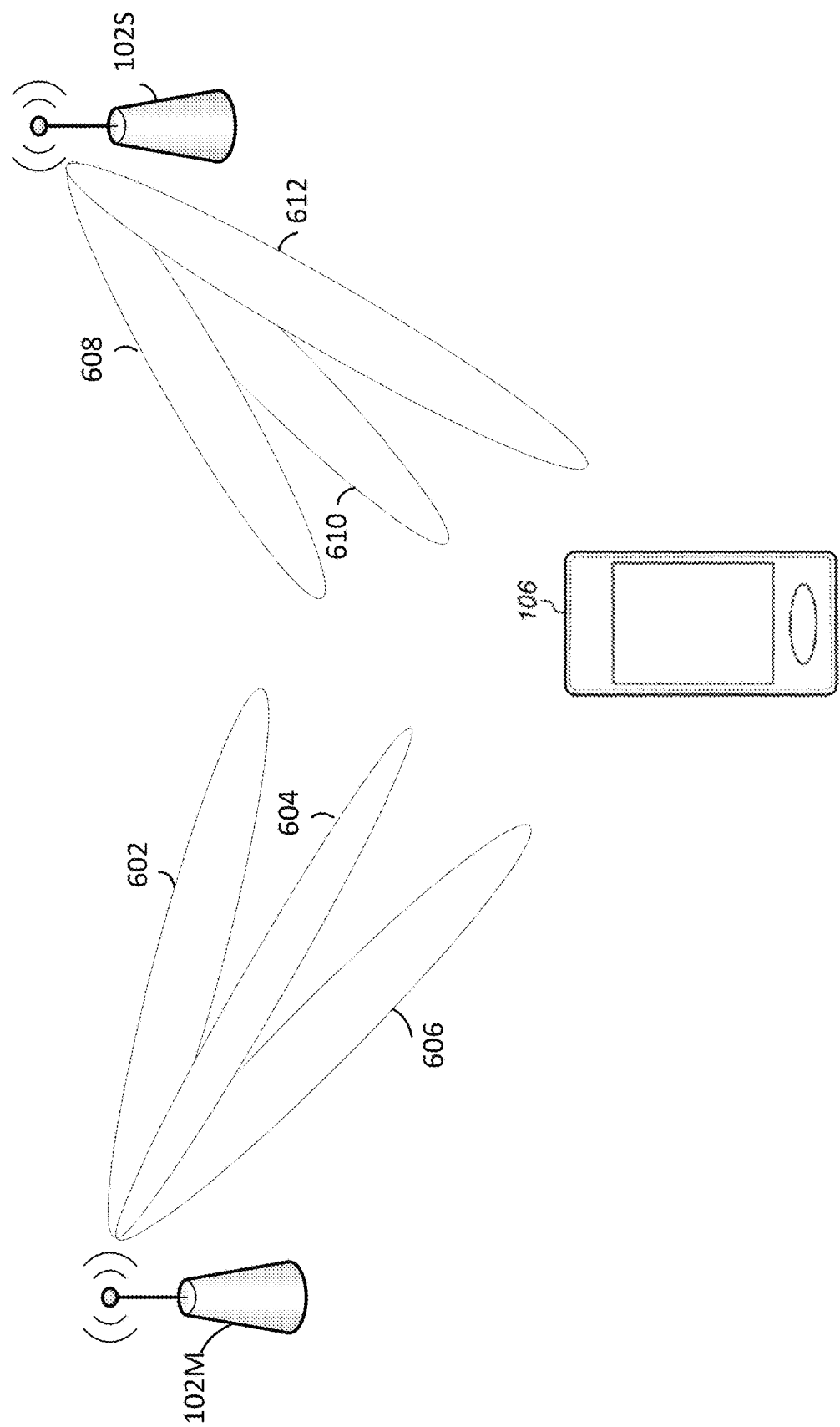
FIG. 6 depicts a base station of a MR-DC system transmitting multiple beams to a UE with some of the beams carrying reference signals for the UE to make RSRP measurements of the reference signals to monitor the radio links, according to one aspect of the disclosure.

FIG. 6 depicts base stations 102M and 102S of a MR-DC system transmitting multiple beams to UE 106 with some of the beams carrying reference signals for the UE 106 to make RSRP measurements of the reference signals to monitor the radio links according to one aspect of the disclosure. Base station 102M may be the primary serving cell (PCell) of the master cell group (MCG). Base station 102S may be the secondary serving cell (PSCell) of the secondary cell group (SCG). The MCG and the SCG may each include a group of serving cells. In the following discussion, the PCell and other serving cells within the MCG and the PSCell may collectively be referred to as the master node (MN). The PSCell and other serving cells within the SCG may collectively be referred to as the secondary node (SN). In one aspect, the MCG may include next generation 4G base station and the SCG may include 5G base station in a MR-DC system referred to as (NG) EN-DC (next generation eNodeB-new radio dual connectivity) in which the 4G and 5G base stations are connected to the 5G core network.

In one aspect, beamforming on base stations 102M, 102S may use multiple antenna elements to generate beams 602, 604, 606, 608, 610, and 612 with varying gains and directionalities. Similarly, UE 10 may use multiple antenna elements to generate multiple beams. In one aspect, the beams may be steerable. Beams 602, 604, and 606 of base station 102M may constitute the MCG radio link. Beams 608, 610, and 612 may constitute the SCG radio link. Each beam may be characterized by pathloss, Doppler shift, delay, or other properties of the radio channel through which the beam propagates.

In one aspect, each beam may carry reference signals for the UE 106 to perform radio link monitoring (RLM). For example, the RLM reference signals may include the synchronization signal/physical broadcast channel SS/PBCH (SSB) resources carried on broad beams used by the UE 106 to perform initial beam sweep to select a desirable beam. The RLM reference signals may also include the channel state information reference signal (CSI-RS) resources carried on more directional beams used by the UE 106 to refine the beam selection. The UE 106 may measure the RSRP of the RLM reference signals as an indication of the radio link quality to switch between the beams as the radio conditions change.

In normal operation condition, the UE 106 maintains its connection with the PCell of the MCG. When the radio link quality of all of the RLM reference signals of the PCell is worse than a threshold for an extended period of time, the UE 106 may detect a radio link failure at the MCG. This may occur during a handover to change the PCell. In other scenarios, MCG radio link failure condition may be detected during a radio link control (RLC) failure such as when the maximum number of radio RLC re-transmissions is reached or a random access procedure failure (RACH failure) such as when the maximum number of preamble transmissions is reached. Detection of the MCG radio link failure condition may trigger the UE to initiate the MCG failure recovery procedure to access the SCG link to deliver the signaling for the procedure.

Figure 7:
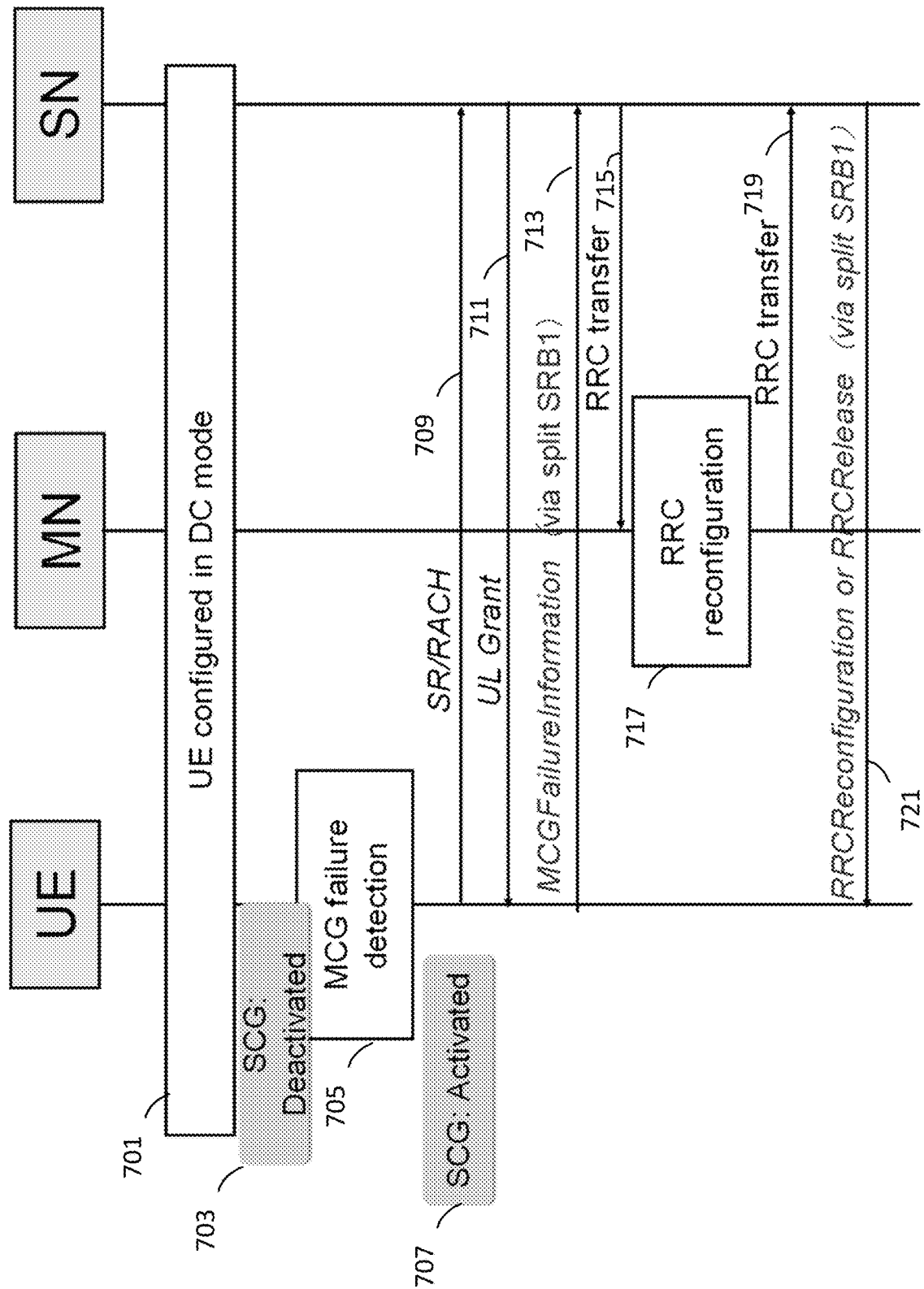
FIG. 7 depicts a call flow diagram between a UE, a MCG primary serving cell, and a SCG primary serving cell of a MR-DC system to activate the SCG link for control signaling as part of a MCG failure recovery procedure when the SCG is initially deactivated, according to one aspect of the disclosure.

FIG. 7 depicts a call flow diagram between a UE, a MCG primary serving cell, and a SCG primary serving cell of a MR-DC system to activate the SCG link for control signaling as part of a MCG failure recovery procedure when the SCG is initially deactivated, according to one aspect of the disclosure.

At operation 701, the network may configure the UE to be in the dual connectivity (DC) mode that includes the master node (MN) and the secondary node (SN). For example, the master node and the secondary node may be deployed in a (NG) EN-DC system that is connected to a 5G core network and that supports activation and deactivation of the SCG. The control signaling protocol may be transmitted and received by the UE on a logical signaling connection such as a signaling radio bearer (SRB). In one aspect, the SRB may be configured as a split SRB to allow signaling messages to be received and transmitted by both the master node and secondary node. In one aspect, the SRB may be configured so it's specific to the secondary node to allow signaling procedures that are time sensitive for the secondary node.

At operation 703, the network may deactivate the SCG. When the SCG is deactivated, no uplink or downlink data transmission is allowed. However, the SCG link may still work for low data rate signaling using the SRB. In one aspect, the network may deactivate the SCG if there is insufficient data traffic to be offloaded to the SCG.

At operation 705, the UE may detect the MCG radio link failure condition. In one aspect, the UE may detect that the RSRP of all of the monitored RLM reference signals of the master node is worse than a configured threshold to indicate an out-of-sync condition. The UE may detect the MCG radio link failure condition when a configured number of consecutive out-of-sync condition is followed by a configured period of time when the UE fails to exceed a second configured threshold. Upon the detection of MCG radio link failure, the UE may suspend transmission over the MCG radio link for all SRBs and DRBs. The UE may maintain a current configuration of radio link monitoring to continue to measure the quality of the MCG and SCG links.

At operation 707, the UE may set the SCG state as activated to use the SCG link to transmit and receive SRB signaling to and from the secondary node using SRB as part of the MCG failure recovery procedure.

At operation 709, the UE may use a random access procedure to the secondary node to request scheduled resources for use in transmitting SRB signaling to the secondary node. For example, the UE may initiate a scheduling request/random access channel (SC/RACH) procedure to the secondary node.

At operation 711, the UE may receive a UL grant from the secondary node indicating the scheduled UL resources for use to transmit SRB signaling to the secondary node.

At operation 713, the UE may transmit MCG radio link failure information to the secondary node using the scheduled resources. In one aspect, the UE may transmit MCG radio link failure information to the secondary node in a MCG failure message using the split SRB. In one aspect, the UE may transmit the MCG radio link failure information to the secondary node using the SRB specific to the secondary node. In one aspect, the MCG radio link failure information may contain the cause of the MCG radio link failure and measurement results of the links to the master node, secondary node, and non-serving cells of the MCG and SCG.

At operation 715, the secondary node may forward the MCG failure information to the master node to request the master node to reconfigure the SCG link to the UE to replace the failed MCG link. In one aspect, the secondary node may transmit the MCG failure information to the master node using a radio resource control (RRC) message.

At operation 717, the master node may evaluate the MCG failure information to determine reconfiguration information for the SCG link. In one aspect, the master node may decide to release all resources of the SCG link if measurement results of the SCG link as reported by the UE indicate the quality of the SCG link is insufficient to replace the MCG link.

At operation 719, the master node may transmit the reconfiguration information for the SCG link or the SCG release indication to the secondary node.

At operation 721, the secondary node may forward the reconfiguration information to the UE to reconfigure the SCG link or the SCG release indication to instruct the UE to release the SCG link. In one aspect, the secondary node may transmit the reconfiguration information or the release indication to the UE in signaling messages using the split SRB or the SCG specific SRB.

In one aspect, the UE may start a countdown timer upon transmitting the MCG radio link failure information to the secondary node of operation 713. The UE may stop the timer upon receiving the reconfiguration information for the SCG link or the SCG release indication. If the timer expires before receiving the reconfiguration information or the release indication, the UE may trigger a connection re-establishment procedure to attempt to recover the MCG link.

Figure 8:
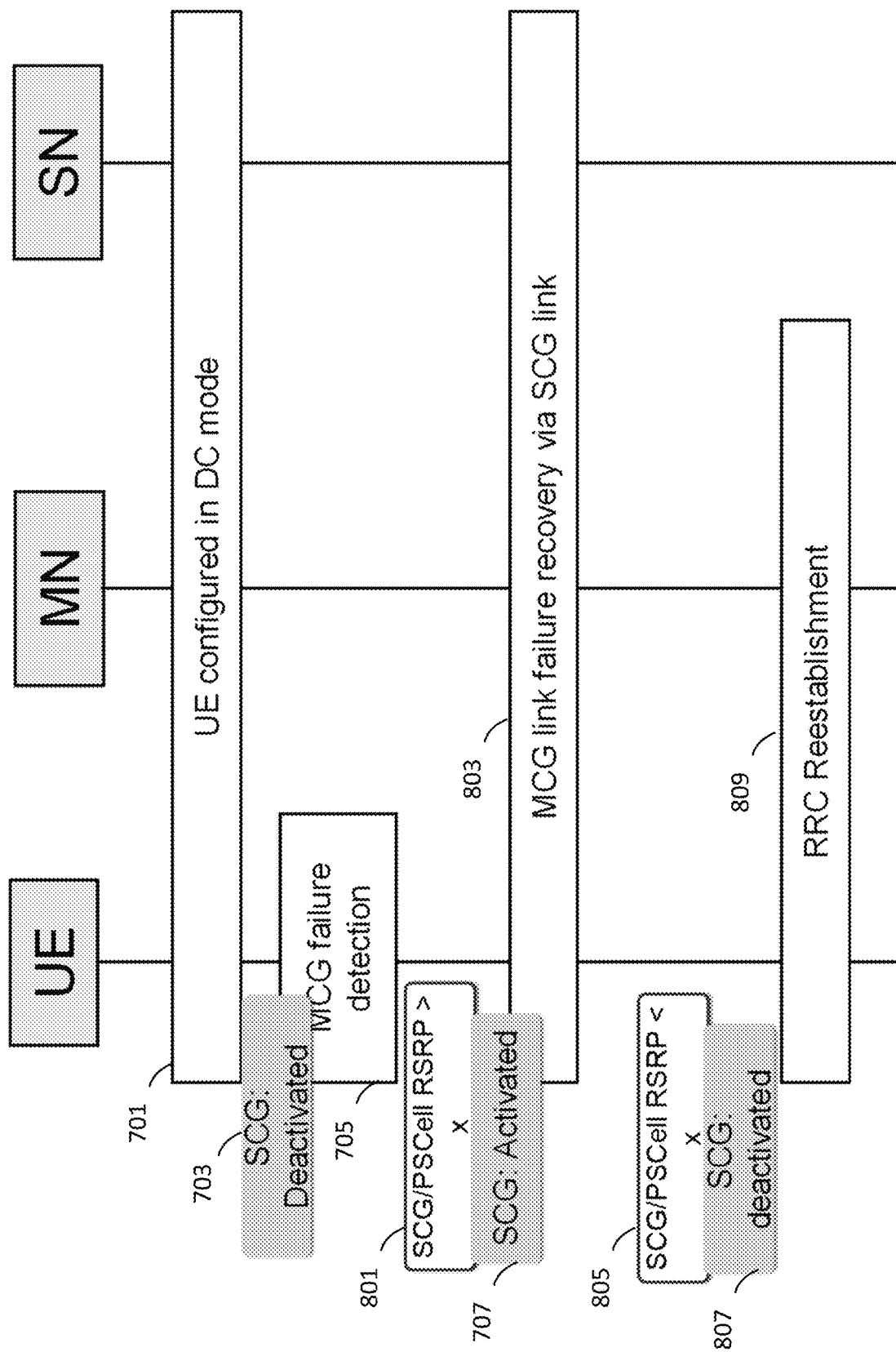
FIG. 8 depicts a call flow diagram between a UE, a MCG primary serving cell, and a SCG primary serving cell of a MR-DC system to verify the quality of the SCG link before activating the SCG link for control signaling as part of a MCG failure recovery procedure when the SCG is initially deactivated, according to one aspect of the disclosure.

FIG. 8 depicts a call flow diagram between a UE, a MCG primary serving cell, and a SCG primary serving cell of a MR-DC system to verify the quality of the SCG link before activating the SCG link for control signaling as part of a MCG failure recovery procedure when the SCG is initially deactivated, according to one aspect of the disclosure.

Operations 701, 703 for the network to configure the UE to be in the DC mode and to deactivate the SCG, and operation 705 for the UE to detect the MCG radio link failure condition may be the same as the operations in FIG. 7.

In operation 801, when the MCG link failure is detected and the SCG is in the deactivated state, the UE may determine if the quality of the radio link to the secondary node as measured by the UE is acceptable before entering the SCG activated state. For example, if the RSRP of the SCG link to the secondary node is greater than a configured threshold, the UE may enter the SCG activated state as in operation 707 of FIG. 7. In one aspect, the UE may determine whether the quality of the SCG link meets certain criteria for cell selection. In one aspect, the network may configure the UE with the cell selection criteria using a broadcast signaling protocol or may configure the UE with the SCG link threshold using a RRC message specific to the UE.

In operation 803, the UE may then use the SCG link for the MCG failure recovery as described in operations 709, 711, 713, 715, 719, and 721 of FIG. 7. The UE may continue to measure the quality of the SCG link as part of the radio link monitoring.

In operation 805, when the MCG link failure is detected but the UE determines that the quality of the radio link to the secondary node is not acceptable, the UE does not enter the SCG activated state. For example, if the RSRP of the SCG link to the secondary node does not exceed a configured threshold or the quality of the SCG link does not meet the criteria for cell selection, the UE may keep the SCG deactivated in operation 807.

In operation 809, when the SCG link is deactivated, the UE may trigger a connection re-establishment procedure to attempt to recover the MCG link.

Figure 9:
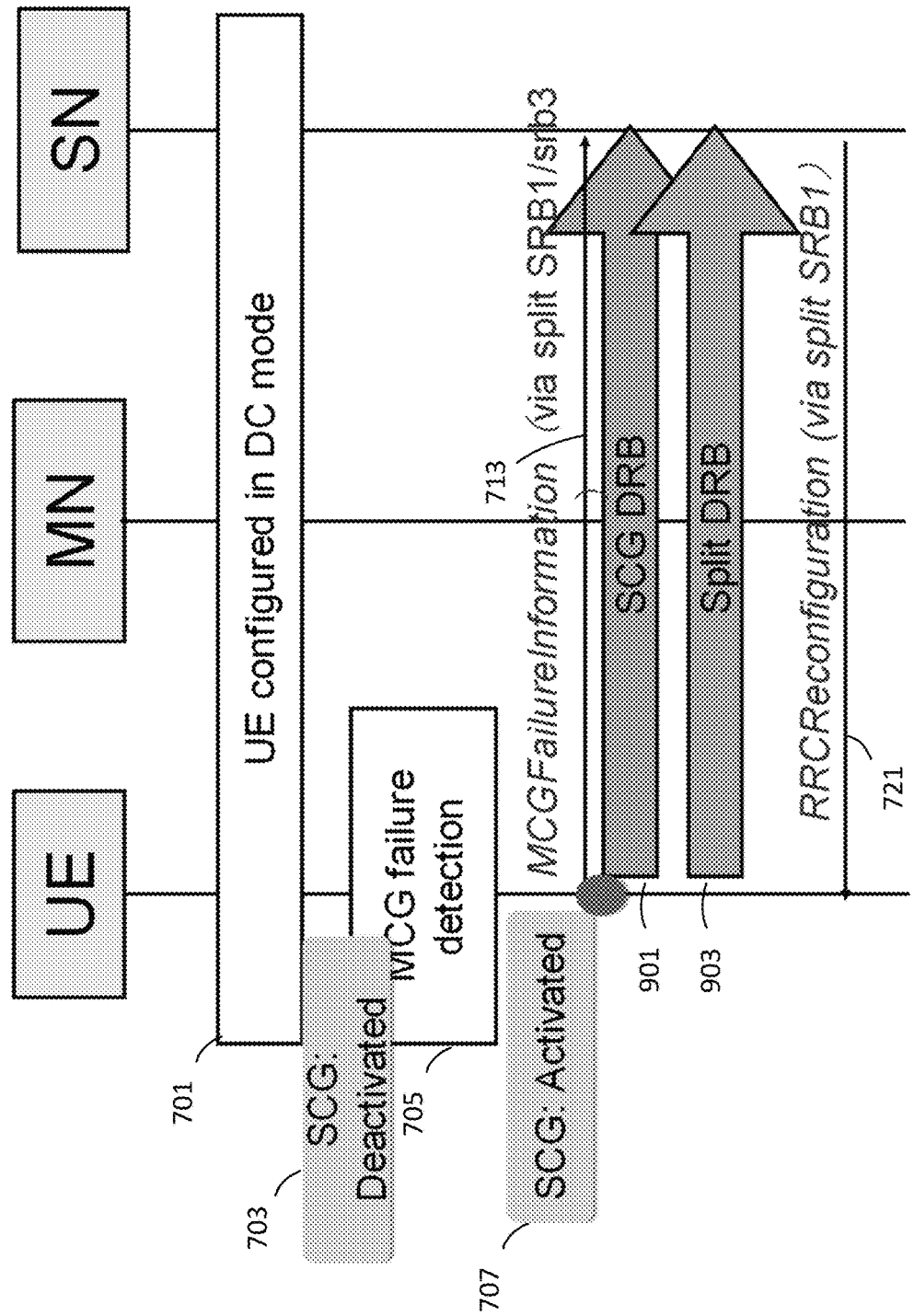
FIG. 9 depicts a call flow diagram between a UE, a MCG primary serving cell, and a SCG primary serving cell of a MR-DC system to activate the SCG link for data as part of a MCG failure recovery procedure when the SCG is initially deactivated, according to one aspect of the disclosure.

FIG. 9 depicts a call flow diagram between a UE, a MCG primary serving cell, and a SCG primary serving cell of a MR-DC system to activate the SCG link for data as part of a MCG failure recovery procedure when the SCG is initially deactivated, according to one aspect of the disclosure.

Operations 701, 703 for the network to configure the UE to be in the DC mode and to deactivate the SCG, and operation 705 for the UE to detect the MCG radio link failure condition may be the same as the operations in FIGS. 7 and 8.

At operation 707, may set the SCG state as activated to use the SCG link to transmit and receive data and signaling messages to and from the secondary node using SRB as part of the MCG failure recovery procedure.

After the UE requests and receives scheduled resources for use in transmitting SRB signaling to the secondary node, the UE may transmit MCG radio link failure information to the secondary node using the split SRB or the SRB specific to the secondary node at 713.

Upon SCG activation and after the UE transmits the MCG failure message to the secondary node, the UE may use the SCG link for DRB transmissions without waiting for the reconfiguration information from the secondary node of operation 721. The UE may request and receive scheduled resources for DRB transmissions to the secondary node. The DRB to the secondary node may be specific to the secondary node or may be configured as a split DRB to allow data to be received and transmitted by both the master node and the secondary node.

For example, in operation 901, the UE may transmit data to the secondary node using the SCG specific DRB.

For the split DRB, the MCG link is normally configured as the primary link or primary leg for data and the SCG link may be used for data only when the amount of data to transfer exceeds a threshold. However, for the MCG failure recovery procedure, the data threshold requirement may be dropped.

In operation 903, for the split DRB, the UE may transmit to, and receive data from, the secondary node using the SCG link regardless of whether the amount of data to transmit exceeds the threshold normally associated with using the SCG link for data. For example, if the SCG link is not the primary leg and even if the current amount of data to transmit is lower than the threshold, the UE may still enable the SCG link for the DRB transmission. In one aspect, the UE may switch the primary leg from the MCG link to the SCG link autonomously.

In operation 721, the UE may receive the reconfiguration information in signaling messages using either the split SRB or the SCG-specific SRB to reconfigure the SCG link.

Figure 10:
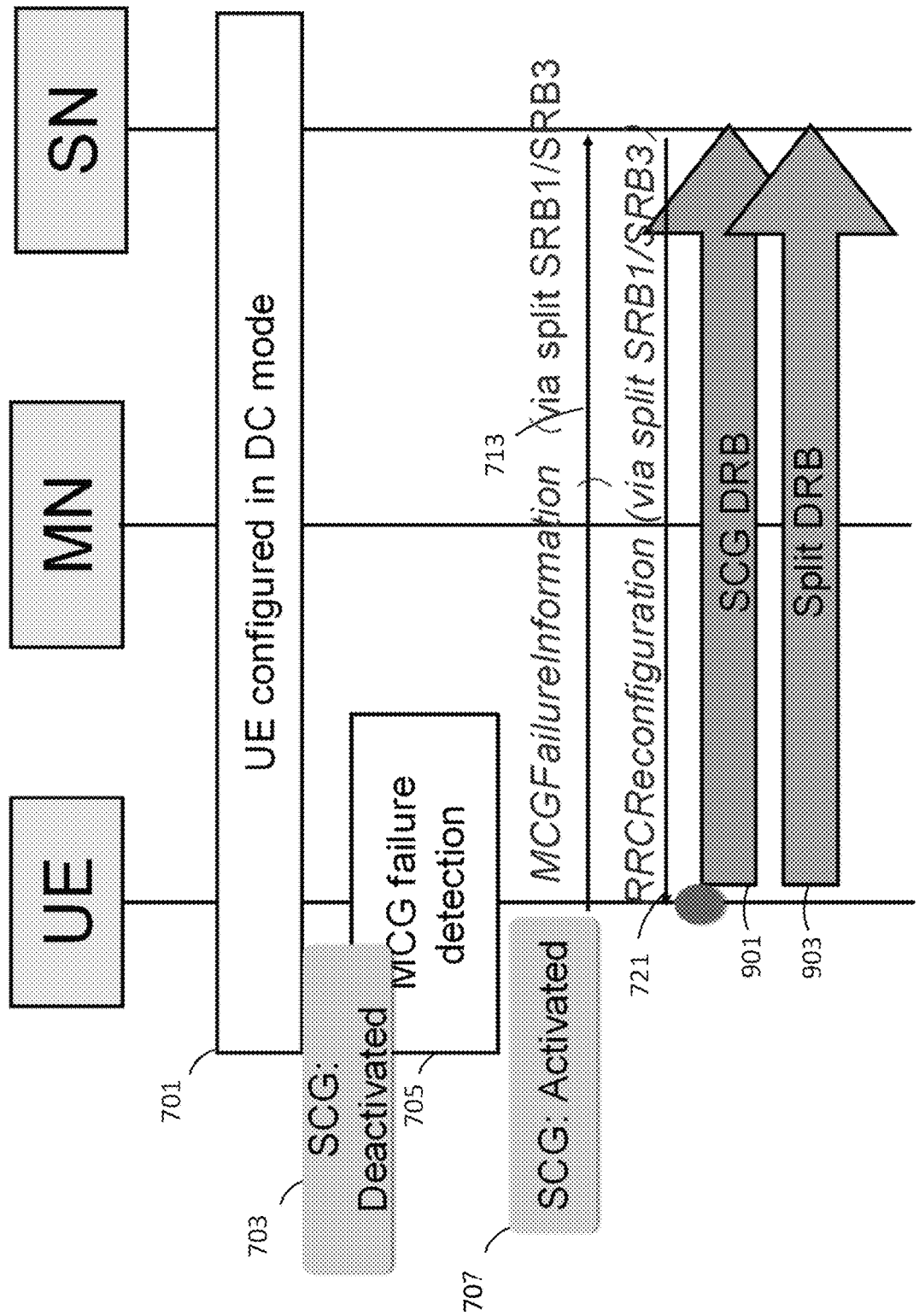
FIG. 10 depicts a call flow diagram between a UE, a MCG primary serving cell, and a SCG primary serving cell of a MR-DC system to activate the SCG link for data and to maintain data transmissions after reconfiguration of the SCG link as part of a MCG failure recovery procedure when the SCG is initially deactivated, according to one aspect of the disclosure.

FIG. 10 depicts a call flow diagram between a UE, a MCG primary serving cell, and a SCG primary serving cell of a MR-DC system to activate the SCG link for data and to maintain data transmissions after reconfiguration of the SCG link as part of a MCG failure recovery procedure when the SCG is initially deactivated, according to one aspect of the disclosure.

In FIG. 10, the MCG failure recovery procedure is the same as that of FIG. 9 before the reconfiguration information is received by the UE from the secondary node in operation 721. The UE may transmit and receive data using the SCG specific DRB or the split DRB of the SCG link upon SCG activation and transmission of the MCG failure message.

In operation 721, the UE receives the reconfiguration information from the secondary node to reconfigure the SCG link in response to the MCG link failure. In one scenario, the reconfigured SCG link may not be able to support data transmissions. The UE may then suspend DRB transmissions to the secondary node through the SCG link. In one aspect, the UE may trigger a connection re-establishment procedure to attempt to recover the MCG link. Otherwise, if the reconfigured SCG link is able to support data transmissions, the UE may continue to transmit and receive data using the SCG specific DRB in operation 901 or using the split DRB in operation 903.

Figure 11:
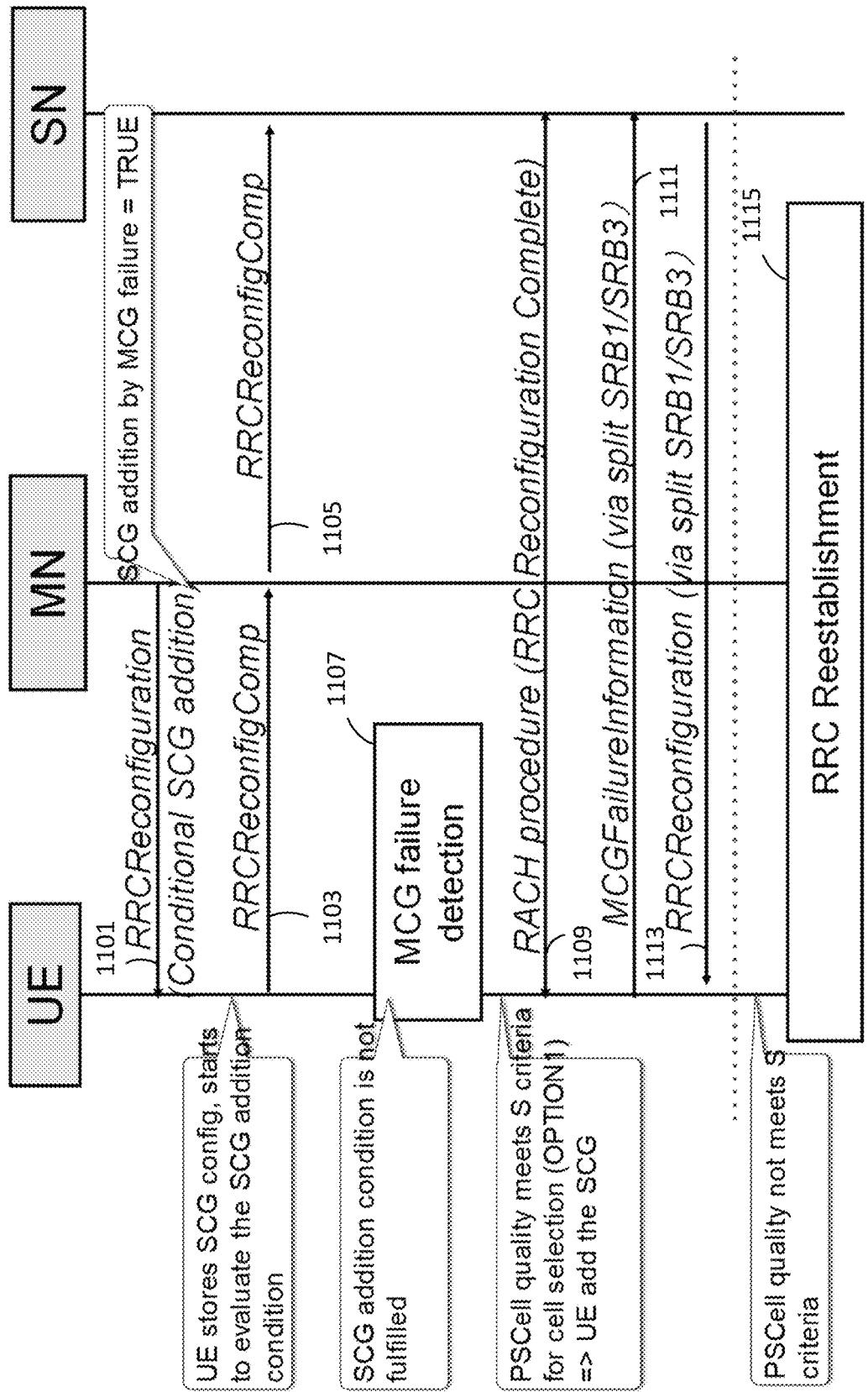
FIG. 11 depicts a call flow diagram between a UE, a MCG primary serving cell, and a SCG primary serving cell of a MR-DC system to add a primary serving cell of the SCG to provide the SCG link as part of a MCG failure recovery procedure when the SCG is initially conditionally unavailable, according to one aspect of the disclosure.

FIG. 11 depicts a call flow diagram between a UE, a MCG primary serving cell, and a SCG primary serving cell of a MR-DC system to add a primary serving cell of the SCG to provide the SCG link as part of a MCG failure recovery procedure when the SCG is initially conditionally unavailable, according to one aspect of the disclosure.

The network may support the conditional addition or change of the secondary node of the SCG to more efficiently manage the traffic flow through the network. For example, the network may conditionally add or change a PSCell upon the satisfaction of certain conditions, such as when high data throughput transmission is expected. In one aspect, the network may provide a target SCG configuration to the UE in advance with conditions for adding the secondary node of the SCG. When a condition is satisfied, such as a need for enabling the SCG link for high data throughput transmission, the UE may apply the SCG configuration to add the secondary node.

In operation 1101, the master node may transmit to the UE conditional SCG configuration information for adding or changing the secondary node of the SCG upon the satisfaction of certain conditions. The UE may store the conditional SCG configuration information and may evaluate the conditions to determine if any of the conditions is satisfied. One of the conditions may be to add or change the secondary node when there is a MCG radio link failure or for other MCG link recovery purposes.

In operation 1103, the UE may transmit a signaling message back to the master node to indicate that the conditional SCG configuration information has been received. In one aspect, the signaling message may indicate that none of the conditions have been satisfied and that the UE has not added or changed the secondary node.

In operation 1105, the master node may forward the signaling message to the secondary node. In one aspect, even though the secondary node has not been added or changed, the SCG link may still be used by the UE for low data rate transmission such as for transmission of signaling messages In operation 1107, the UE may detect the MCG radio link failure condition. Upon the detection of MCG radio link failure, the UE may suspend transmission over the MCG radio link for all SRBs and DRBs. The UE may maintain a current configuration of radio link monitoring to continue to measure the quality of the MCG and SCG links.

The UE may determine that the condition for adding or changing the secondary node when there is a MCG radio link failure has been satisfied. Before the UE adds or changes the secondary node, the UE may verify that the quality of the SCG link is acceptable. In one aspect, the UE may determine whether the quality of the SCG link meets certain criteria for cell selection. In one aspect, the UE may determine if the RSRP of the SCG link is greater than a configured threshold. If the quality of the SCG link meets the criteria for cell section or is greater than the configured threshold, the UE may apply the stored conditional SCG configuration information and may perform a procedure to add or change the secondary node.

In operation 1109, the UE may use a random access procedure to the secondary node to request scheduled resources for use in transmitting SRB signaling to the secondary node. For example, the UE may initiate a scheduling request/random access channel (SC/RACH) procedure to the secondary node. In one aspect, the UE may transmit a signaling message as part of the random access procedure to indicate to the secondary node that a condition for adding or changing the secondary node has been satisfied and that the UE has applied the conditional SCG configuration information to add or change the secondary node.

In operation 1111, after the UE receives the requested scheduled resources for transmitting SRB signaling, the UE may transmit MCG radio link failure information to the secondary node using a SCG specific SRB or a split SRB. In one aspect, the MCG radio link failure information may contain the cause of the MCG radio link failure and measurement results of the links to the master node, secondary node, and non-serving cells of the MCG and SCG. In one aspect, upon adding or changing the secondary node and after the UE transmits the MCG radio link failure information to the secondary node, the UE may use the SCG link for DRB transmissions.

In operation 1113, the UE receives the reconfiguration information on the SCG-specific SRB or the split SRB from the secondary node to reconfigure the SCG link in response to the MCG link failure.

If, after the UE determines that the condition for adding or changing the secondary node has been satisfied in operation 1107, but the quality of the SCG link is not acceptable, the UE does not add or change the secondary note. For example, if the quality of the SCG link does not meet the criteria for cell section or is not greater than the configured threshold, the UE may trigger a connection re-establishment procedure to attempt to recover the MCG link in operation 1115.

Figure 12:
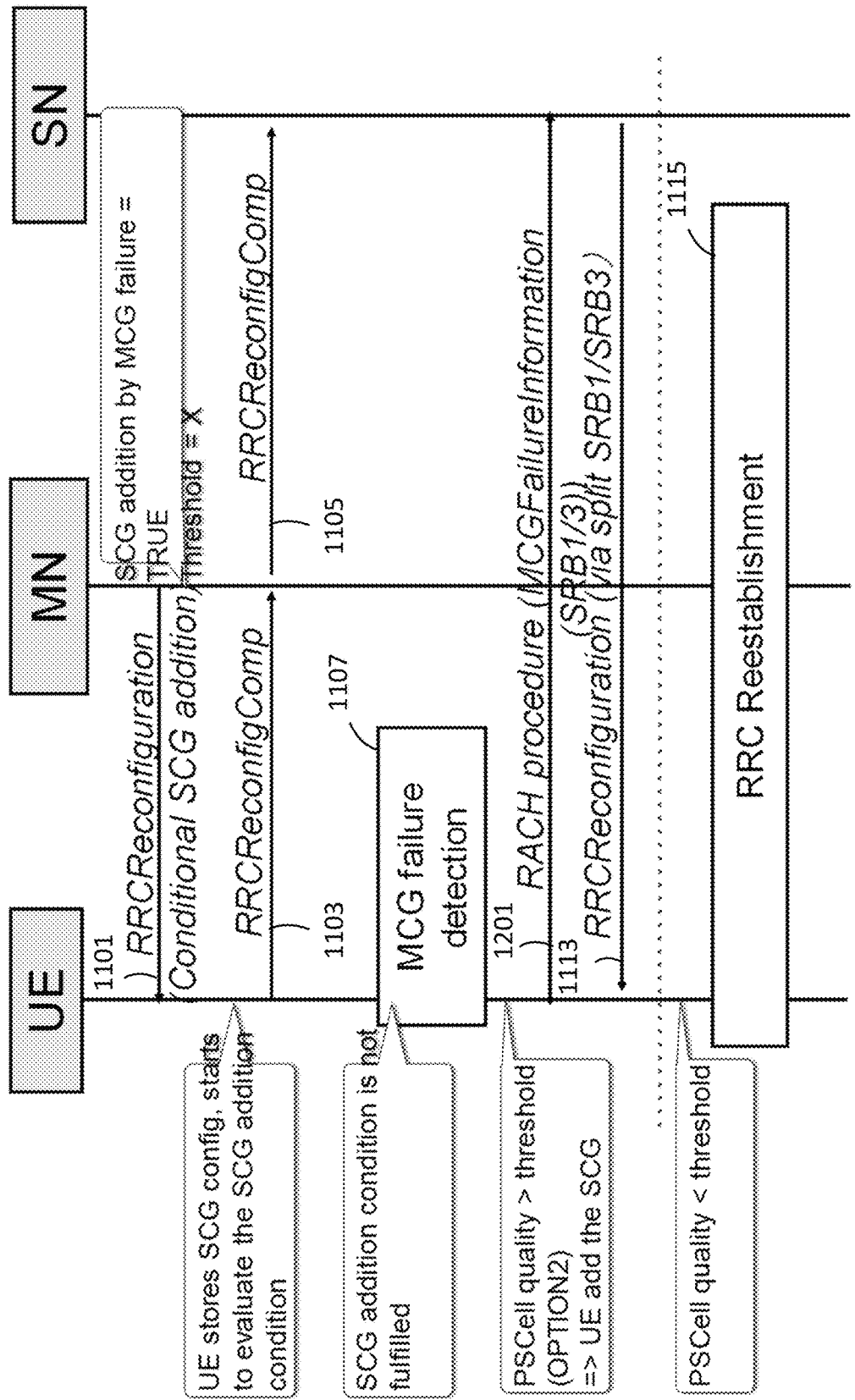
FIG. 12 depicts a call flow diagram between a UE, a MCG primary serving cell, and a SCG primary serving cell of a MR-DC system to add a primary serving cell of the SCG to provide the SCG link for a more compact signaling protocol as part of a MCG failure recovery procedure when the SCG is initially conditionally unavailable, according to one aspect of the disclosure.

FIG. 12 depicts a call flow diagram between a UE, a MCG primary serving cell, and a SCG primary serving cell of a MR-DC system to add a primary serving cell of the SCG to provide the SCG link for a more compact signaling protocol as part of a MCG failure recovery procedure when the SCG is initially conditionally unavailable, according to one aspect of the disclosure.

In FIG. 12, the MCG failure recovery procedure is similar to operation 1101, 1103, 1105, 1107, and 1113 of FIG. 11 for the UE to apply the stored conditional SCGT configuration information to add or change the secondary node when there is a MCG radio link failure condition. However, instead of separately transmitting the MCG radio link failure information to the secondary node after the random access procedure, the UE may transmit the MCG radio link failure information as part of the random access procedure. The secondary node may interpret the MCG radio link failure information as indicating that that the UE has applied the conditional SCG configuration information to add or change the secondary node as part of the MCG failure recovery procedure.

In operation 1201, instead of transmitting the signaling message to indicate that the UE has applied the conditional SCG configuration to add or change the secondary node during the RACH procedure, the UE may transmit the MCG radio link failure information. The operations of FIG. 12 provide for a more compact signaling protocol compared to those of FIG. 11.

Figure 13:
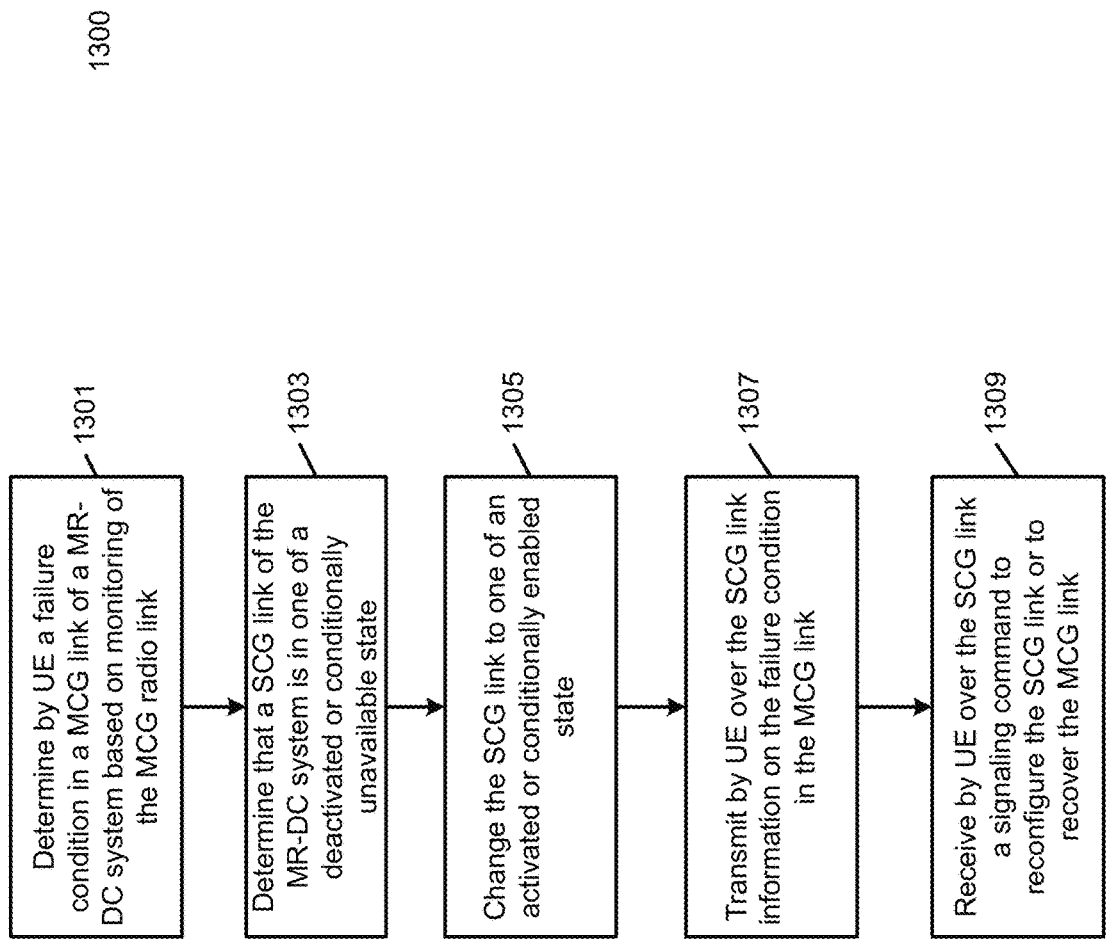
FIG. 13 is a flow diagram of a method for a UE to activate or conditionally add the SCG link of a MR-DC system as part of a MCG failure recovery procedure according to one aspect of the disclosure.

FIG. 13 is a flow diagram of a method 1300 for a UE to activate or conditionally add the SCG link of a MR-DC system as part of a MCG failure recovery procedure according to one aspect of the disclosure. The method 1300 may be practiced by the UE of FIG. 1, 2, 3, 6, 7, 8, 9, 10, 11, or 12.

In operation 1301, the UE determines a failure condition in the MCG radio link based on radio link monitoring. In one aspect, the UE may determine the MCG radio link failure condition when the radio link quality of all of the RLM reference signals of the MCG link as measured by the UE does not exceed a threshold for a configured period of time.

In operation 1303, the UE determines that the SCG radio link is either deactivated or conditionally unavailable. In one aspect, the SCG radio link may be deactivated by the network if there is insufficient data traffic to be offloaded to the SCG. In one aspect, the SCG radio link is conditionally unavailable pending the satisfaction of certain conditions, such as when high data throughput transmission is expected. In one aspect, when the SCG link is deactivated or conditionally unavailable, no uplink or downlink data transmission is allowed. However, the SCG link may still work for low data rate signaling using the SRB.

In operation 1305, the UE changes the SCG radio link to either an activated or a conditionally available state. The UE may set the state of the SCG link to activated or conditionally available to use the SCG link to transmit and receive SRB signaling to and from the SCG using SRB as part of the MCG failure recovery procedure. In one aspect, the UE may apply conditional SCG configuration information that was previously received by the UE and may perform a procedure to add or change the SCG.

In operation 1307, the UE transmits over the SCG radio link information on the failure condition in the MCG radio link. In one aspect, the UE may transmit MCG radio link failure information containing the cause of the MCG radio link failure and measurement results of the MCG and SCG radio links using SRB signaling over the SCG radio link.

In operation 1309, the UE receives over the SCG radio link a signaling command to reconfigure the SCG radio link to replace the MCG radio link. In one aspect, the signaling command may command the UE to stop using the reconfigured SCG radio link for data transmission if the quality of the SCG radio link does not support data transmission. The UE may trigger a connection re-establishment procedure to attempt to recover the MCG radio link.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of recovering from radio link failures by a wireless user equipment (UE) of a multi-radio access technology dual connectivity (MR-DC) system in a communication network, the method comprising:
    determining, by the UE, a failure condition in a master cell group (MCG) radio link between the UE and a master base station of the MCG of the MR-DC system based on monitoring of the MCG radio link;
    determining, by the UE, that a secondary cell group (SCG) radio link between the UE and a secondary base station of the SCG of the MR-DC system is in one of a deactivated or a conditionally unavailable state;
    changing, by the UE, the SCG radio link to one of an activated or a conditionally available state;
    transmitting, by the UE to the secondary base station over the SCG radio link, information on the failure condition in the MCG radio link; and
    receiving, by the UE from the secondary base station over the SCG radio link, a signaling command to reconfigure the SCG radio link or to recover the MCG radio link.

2. The method of claim 1, wherein determining the failure condition in the MCG radio link comprises:
    determining that a quality of the MCG radio link is below a threshold based on said monitoring of the MCG radio link.

3. The method of claim 1, wherein changing the SCG radio link to the activated state comprises:
monitoring the SCG radio link; and
determining that a quality of the SCG radio link exceeds a threshold based on said monitoring of the SCG radio link.

4. The method of claim 1, further comprising:
transmitting, by the UE to the secondary base station over the SCG radio link, data following the transmitting of the information on the failure condition in the MCG radio link to the secondary base station.

5. A baseband processor of a wireless user equipment (UE) of a multi-radio access technology dual connectivity (MR-DC) system configured to perform operations to recover from radio link failures comprising:
determine a failure condition in a master cell group (MCG) radio link between the UE and a master base station of the MCG of the MR-DC system based on monitoring of the MCG radio link;
determine that a secondary cell group (SCG) radio link between the UE and a secondary base station of the SCG of the MR-DC system is in one of a deactivated or a conditionally unavailable state;
change the SCG radio link to one of an activated or a conditionally available state;
transmit to the secondary base station over the SCG radio link information on the failure condition in the MCG radio link; and
receive from the secondary base station over the SCG radio link a signaling command to reconfigure the SCG radio link or to recover the MCG radio link.

6. The baseband processor of claim 5, wherein the operations to determine the failure condition in the MCG radio link comprises operations to:
determine that a quality of the MCG radio link is below a threshold based on the monitoring of the MCG radio link.

7. The baseband processor of claim 5, wherein the operations to change the SCG radio link to the activated state comprises operations to:
monitor the SCG radio link; and
determine that a quality of the SCG radio link exceeds a threshold based on the monitor of the SCG radio link.

8. The baseband processor of claim 7, wherein the operations further comprise:
determine that a quality of the SCG radio link fails to exceed the threshold based on said monitoring of the SCG radio link; and
generate a request to the master base station to recover the MCG radio link.

9. The baseband processor of claim 5, wherein the operations further comprise:
transmit data to the secondary base station over the SCG radio link following transmission of the information on the failure condition in the MCG radio link to the secondary base station over the SCG radio link.

10. The baseband processor of claim 9, wherein the data is transmitted using a logical data connection specific the SCG radio link.

11. The baseband processor of claim 9, wherein the data is transmitted over a logical data connection configured for both the SCG radio link and the MCG radio link regardless of an amount of data to transmit.

12. The baseband processor of claim 9, wherein the operations further comprise:
determine to stop transmit data over the SCG radio link based on the received signaling command used to reconfigure the SCG radio link.

13. The baseband processor of claim 5, wherein the SCG radio link is determined to be in the conditionally unavailable state when the UE is configured by a communication network to apply a conditional SCG configuration to add or change the secondary base station, and a condition to add or change the secondary base station is unsatisfied.

14. The baseband processor of claim 13, wherein the operations to change the SCG radio link to the conditionally available state comprises operations to:
determine that the condition to add or change the secondary base station includes the failure condition in the MCG radio link;
monitor the SCG radio link;
determine that a quality of the SCG radio link exceeds a threshold based on the monitor of the SCG radio link; and
apply the conditional SCG configuration to add or change the secondary base station.

15. The baseband processor of claim 14, wherein the operations further comprise:
transmit a signaling message as part of a random access procedure to the secondary base station over the SCG radio link to indicate to the secondary base station that the SCG is added or changed by the UE.

16. The baseband processor of claim 14, wherein the operations to transmit the information on the failure condition in the MCG radio link comprises operations to:
transmit the information on the failure condition in the MCG radio link as part of a random access procedure to the secondary base station over the SCG radio link to indicate to the secondary base station that the SCG is added or changed by the UE.

17. The baseband processor of claim 14, wherein the operations further comprise:
determine that a quality of the SCG radio link fails to exceed the threshold based on the monitor of the SCG radio link; and
generate a request to the master base station to recover the MCG radio link.

18. A user equipment (UE) comprising:
at least one antenna;
at least one radio, wherein the at least one radio is configured to communicate with a multi-radio access technology dual connectivity (MR-DC) system of a communication network using the at least one antenna; and
at least one processor coupled to the at least one radio, wherein the at least one processor is configured to perform operations to recover from radio link failures comprising:
determine a failure condition in a master cell group (MCG) radio link between the UE and a master base station of the MCG of the MR-DC system based on monitoring of the MCG radio link;
determine that a secondary cell group (SCG) radio link between the UE and a secondary base station of the SCG of the MR-DC system is in one of a deactivated or a conditionally unavailable state;
change the SCG radio link to one of an activated or a conditionally available state;
transmit to the secondary base station over the SCG radio link information on the failure condition in the MCG radio link; and receive from the secondary base station over the SCG radio link a signaling command to reconfigure the SCG radio link or to recover the MCG radio link.

19. The UE of claim 18, wherein the operations further comprise:
transmit data to the secondary base station over the SCG radio link following transmission of the information on the failure condition in the MCG radio link to the secondary base station over the SCG radio link.

20. The UE of claim 18, wherein the SCG radio link is determined to be in the conditionally unavailable state when the UE is configured by the communication network to apply a conditional SCG configuration to add or change the secondary base station, and a condition to add or change the secondary base station is unsatisfied.

* * * * *